United States Patent
Yu et al.

(10) Patent No.: US 10,644,626 B2
(45) Date of Patent: May 5, 2020

(54) METHOD AND SYSTEM FOR ACQUIRING ROTOR POSITION OF ROTARY TRANSFORMER

(71) Applicant: SUNGROW POWER SUPPLY CO., LTD., Anhui (CN)

(72) Inventors: Anbo Yu, Anhui (CN); Chengwei Zhang, Anhui (CN); Enli Du, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 0 days.

(21) Appl. No.: 16/283,402

(22) Filed: Feb. 22, 2019

(65) Prior Publication Data
US 2019/0372491 A1 Dec. 5, 2019

(30) Foreign Application Priority Data
May 30, 2018 (CN) .......................... 2018 1 0538186

(51) Int. Cl.
*H02P 6/18* (2016.01)

(52) U.S. Cl.
CPC .......... *H02P 6/186* (2013.01); *H02P 2203/01* (2013.01)

(58) Field of Classification Search
USPC .................................................. 318/599–608
See application file for complete search history.

(56) References Cited

U.S. PATENT DOCUMENTS

| 2014/0015458 A1* | 1/2014 | Lin ........................ H02P 6/188 |
| | | 318/400.03 |
| 2016/0087560 A1* | 3/2016 | Miller ...................... H02P 6/06 |
| | | 318/400.03 |
| 2017/0227567 A1 | 8/2017 | Son et al. | |

FOREIGN PATENT DOCUMENTS

| CN | 102721362 A | 10/2012 |
| CN | 102937787 A | 2/2013 |
| CN | 105915127 A | 8/2016 |
| CN | 106092150 A | 11/2016 |
| CN | 106953557 A | 7/2017 |
| CN | 107863913 A | 3/2018 |

OTHER PUBLICATIONS

First Chinese Office Action regarding Application No. 201810538186.4 dated Jul. 25, 2019.
Extended European Search Report regarding Application No. 19157711.3 dated Aug. 22, 2019.

* cited by examiner

*Primary Examiner* — Bentsu Ro
(74) *Attorney, Agent, or Firm* — Harness, Dickey & Pierce, P.L.C.

(57) ABSTRACT

A method and a system for acquiring a rotor position of a rotary transformer are provided. The system includes: a rotary transformer decoder, a low pass filter and a microprocessor, which includes a synchronous demodulation module and a calculation module. The rotary transformer decoder outputs an excitation signal and acquires first position information of the motor rotor. The calculation module performs calculation to acquire second position information of the motor rotor. The rotary transformer decoder and software decoding are integrated to acquire two rotor positions, and the two rotor positions are compared. In a case that a preset determining condition is met, one of the rotor positions is used for motor control, and the other is used as (Continued)

redundant data for backup, thereby improving the reliability of the acquired rotor position.

18 Claims, 4 Drawing Sheets

METHOD AND SYSTEM FOR ACQUIRING ROTOR POSITION OF ROTARY TRANSFORMER

The present application claims priority to Chinese Patent Application No. 201810538186.4, titled "METHOD AND SYSTEM FOR ACQUIRING ROTOR POSITION OF ROTARY TRANSFORMER", filed on May 30, 2018 with the Chinese Patent Office, which is incorporated herein by reference in its entirety.

FIELD

The present disclosure relates to the field of technologies for controlling new energy motors, and in particular to a method and a system for acquiring a rotor position of a rotary transformer.

BACKGROUND

The output voltage of a rotary transformer varies with the rotor position. Therefore, the output voltage of the rotary transformer is generally used by a motor control system to acquire the rotor position.

The rotor position is generally acquired in two manners. In one manner, the rotor position is acquired by a rotary transformer decoder, and then a system microprocessor reads the rotor position via a serial or parallel communication link to the decoder device. In another manner, software decoding is applied, that is, the system microprocessor sends a sinusoidal excitation signal to the rotary transformer, receives a sinusoidal feedback signal and a cosine feedback signal from the rotary transformer via an analog sampling port of the system microprocessor, and performs calculation to acquire the rotor position by using a certain algorithm.

However, there is a risk of failure when the rotor position is acquired in the above two manners, and inaccurate detection results may lead to a critical system fault. Therefore, an issue to be solved by those skilled in the art is to provide a system for acquiring a rotor position of a rotary transformer, with which the reliability of the acquired rotor position can be improved.

SUMMARY

In view of this, a system for acquiring a rotor position of a rotary transformer is provided according to an embodiment of the present disclosure. In the system, a rotary transformer decoder acquires a rotor position, a synchronous demodulation module acquires a rotary transformer sinusoid signal and a rotary transformer cosine signal outputted from the rotary transformer decoder, and a calculation module acquires another rotor position according to a preset algorithm. With this system, the reliability of the acquired rotor position can be improved.

The following technical solutions are provided according to the present disclosure to achieve the above object.

A system for acquiring a rotor position of a rotary transformer is provided, which includes: a rotary transformer decoder, a low pass filter and a microprocessor. The microprocessor includes a synchronous demodulation module and a calculation module.

The rotary transformer decoder is electrically connected to the rotary transformer through the low pass filter, and is configured to output an excitation signal to drive the rotary transformer and acquire first position information of the motor rotor of the rotary transformer, the first position information including at least a first rotor position and a first rotor speed.

The synchronous demodulation module is electrically connected to the rotary transformer decoder and the rotary transformer, and is configured to collect at least a rotary transformer cosine signal and a rotary transformer sinusoidal signal outputted from the rotary transformer and output a feedback signal. The feedback signal includes at least a target rotary transformer sinusoidal signal and a target rotary transformer cosine signal.

The calculation module is connected to the synchronous demodulation module, and is configured to perform calculation to acquire second position information of the motor rotor of the rotary transformer based on the feedback signal and according to a preset algorithm. The second position information includes at least a second rotor position and a second rotor speed.

In an embodiment, the system further includes a comparison module configured to compare the first position information with the second position information. In a case that a difference between the first position information and the second position information is less than or equal to a first preset threshold, one of the first position information and the second position information is outputted as target output information of the rotary transformer. In a case that the difference between the first position information and the second position information is greater than the first preset threshold, an alarm message is sent.

In an embodiment, the synchronous demodulation module includes a first analog-to-digital conversion module, a first low pass filter, and a first data decimation module.

The first analog-to-digital conversion module is configured to acquire a first excitation signal with a phase delay of a first preset value obtained based on the excitation signal, the rotary transformer sinusoidal signal and the rotary transformer cosine signal with a phase delay of a second preset value, output a first digitalized excitation signal, a first digitalized rotary transformer sinusoidal signal, and a first digitalized rotary transformer cosine signal. Calculation is performed based on the first digitalized excitation signal, the first digitalized rotating sinusoidal signal, and the first digitalized rotating cosine signal, to acquire a first signal and a second signal.

The first low pass filter is configured to filter the first signal and the second signal to acquire a first filtered signal and a second filtered signal.

The first data decimation module is configured perform data decimation on the first filtered signal and the second filtered signal to acquire the target rotary transformer sinusoidal signal and the target rotary transformer cosine signal, respectively.

In an embodiment, an absolute value of a difference between the first preset value and the second preset value is less than or equal to 45 degrees.

In an embodiment, the calculation performed based on the first digitalized excitation signal, the first digitalized rotating sinusoidal signal, and the first digitalized rotating cosine signal, to acquire the first signal and the second signal includes: obtaining a product of the first digitalized excitation signal and the first digitalized rotary transformer sinusoidal signal as the first signal, and obtaining a product of the first digitalized excitation signal and the first digitalized rotary transformer cosine signal as the second signal.

In an embodiment, the synchronous demodulation module includes a pulse capture module, a signal construction module, a second analog-to-digital conversion module, a second low pass filter, and a second data decimation module.

The excitation signal is converted into a second excitation signal by a preset comparator. The pulse capture module is configured to acquire a period of the second excitation signal. The signal construction module is connected to the pulse capture module, and is configured to acquire a signal parameter of the excitation signal and construct a constructed excitation signal based on the signal parameter, the signal parameter including at least a frequency and a phase of the excitation signal.

The second analog-to-digital conversion module is configured to acquire the rotary transformer sinusoidal signal and the rotary transformer cosine signal, and output a second digitalized rotary transformer sinusoidal signal and a second digitalized rotary transformer cosine signal. Calculation is performed based on the constructed excitation signal, the second digitalized rotary transformer sinusoidal signal, and the second digitalized rotary transformer cosine signal, to acquire a third signal and a fourth signal.

The second low pass filter is configured to filter the third signal and the fourth signal to acquire a third filtered signal and a fourth filtered signal.

The second data decimation module is configured to perform data decimation on the third filtered signal and the fourth filtered signal to acquire the target rotary transformer sinusoidal signal and the target rotary transformer cosine signal.

In an embodiment, the calculation performed based on the constructed excitation signal, the second digitalized rotary transformer sinusoidal signal, and the second digitalized rotary transformer cosine signal, to acquire the third signal and the fourth signal includes: obtaining a product of the constructed excitation signal and the second digitalized rotary transformer sinusoidal signal as the third signal, and obtaining a product of the constructed excitation signal and the second digitalized rotary transformer cosine signal as the fourth signal.

In an embodiment, the calculation module being configured to perform calculation to acquire the second position information of the motor rotor of the rotary transformer based on the feedback signal and according to the preset algorithm includes: the calculation module being configured to lock phases of the target rotary transformer sinusoidal signal and the target rotary transformer cosine signal and acquire the second rotor position and the second rotor speed of the rotary transformer, based on an observer.

In an embodiment, the calculation module being configured to perform calculation to acquire the second position information of the motor rotor of the rotary transformer based on the feedback signal and according to the preset algorithm includes: the calculation module being configured to lock phases of the target rotary transformer sinusoidal signal and the target rotary transformer cosine signal and acquire the second rotor position and the second rotor speed of the rotary transformer, based on an observer.

A method for acquiring a rotor position of a rotary transformer is provided. The method is applied to the system for acquiring a rotor position of a rotary transformer according to any one of the above embodiment. The method includes:

outputting an excitation signal to drive the rotary transformer, acquiring first position information of the motor rotor of the rotary transformer, the first position information including at least a first rotor position and a first rotor speed, obtaining at least a rotary transformer cosine signal and a rotary transformer sinusoidal signal outputted from the rotary transformer and outputting a feedback signal, the feedback signal including at least a target rotary transformer sinusoidal signal and a target rotary transformer cosine signal, and performing calculation to acquire second position information of the motor rotor of the rotary transformer, based on the feedback signal and according to a preset algorithm, the second position information including at least a second rotor position and a second rotor speed.

In an embodiment, the method further includes:

comparing the first position information with the second position information, outputting one of the first position information and the second position information as a target output information of the rotary transformer in a case that a difference between the first position information and the second position information is less than or equal to a first preset threshold, and sending an alarm message in a case that the difference between the first position information and the second position information is greater than the first preset threshold.

On basis of the above technical solution, a system for acquiring a rotor position of a rotary transformer is provided according to the embodiments of the present disclosure, which includes: a rotary transformer decoder, a low pass filter and a microprocessor. The microprocessor includes a synchronous demodulation module and a calculation module. The rotary transformer decoder is electrically connected to the rotary transformer through the low pass filter, and is configured to output an excitation signal to drive the rotary transformer and acquire first position information of the motor rotor of the rotary transformer, the first position information including at least a first rotor position and a first rotor speed. The synchronous demodulation module is electrically connected to the rotary transformer decoder and the rotary transformer, and is configured to collect at least a rotary transformer cosine signal and a rotary transformer sinusoidal signal outputted from the rotary transformer and output a feedback signal. The feedback signal includes at least a target rotary transformer sinusoidal signal and a target rotary transformer cosine signal. The calculation module is connected to the synchronous demodulation module, and is configured to perform calculation to acquire second position information of the motor rotor of the rotary transformer based on the feedback signal and according to a preset algorithm. The second position information includes at least a second rotor position and a second rotor speed. As can be seen, according to the technical solution of the present disclosure, the rotary transformer decoder acquires the rotor position, the synchronous demodulation module acquires the rotary transformer sinusoid signal and the rotary transformer cosine signal outputted from the rotary transformer decoder, and the calculation module acquires another rotor position according to a preset algorithm. With this system, the reliability of the acquired rotor position can be improved.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

As described in the background, a rotary transformer decoder or software decoding is currently used to acquire a rotor position. However, there is a risk of failure when the rotor position is acquired in the above two manners, and inaccurate detection results may lead to a system fault.

On this basis, a system for acquiring a rotor position of a rotary transformer is provided according to an embodiment of the present disclosure. In the system, a rotary transformer decoder acquires a rotor position, a synchronous demodulation module acquires a rotary transformer sinusoid signal and a rotary transformer cosine signal outputted from the rotary transformer decoder, and a calculation module acquires another rotor position according to a preset algorithm. With this system, the reliability of the acquired rotor position can be improved. In this solution, the rotary transformer decoder and software decoding are integrated into the motor control system to acquire two rotor positions, and the two rotor positions are compared. In a case that a preset determining condition is met, one of the rotor positions is used for motor control, and the other is used as redundant data for backup, thereby improving the reliability of the acquired rotor position.

It should be noted that, this solution does not simply combine the rotary transformer decoder with the software decoding. Instead, a rotary transformer decoder output an excitation signal to drive the rotary transformer, and a synchronous demodulation module acquires at least a rotary transformer sinusoidal signal and a rotary transformer cosine signal fed back by the rotary transformer. The rotor positions acquired in the two manners are mutually redundant to improve the reliability of the system function.

Specifically, the inventors found that the exact phase of the excitation signal cannot be obtained with the existing software decoding program, and therefore it cannot be guaranteed that the feedback rotary transformer sinusoidal signal and the feedback rotary transformer cosine signal are sampled at points near the peak value. Therefore, the result obtained by using the existing software decoding program deviates greatly from the actual value, and cannot be used as redundant data.

Figure 1:
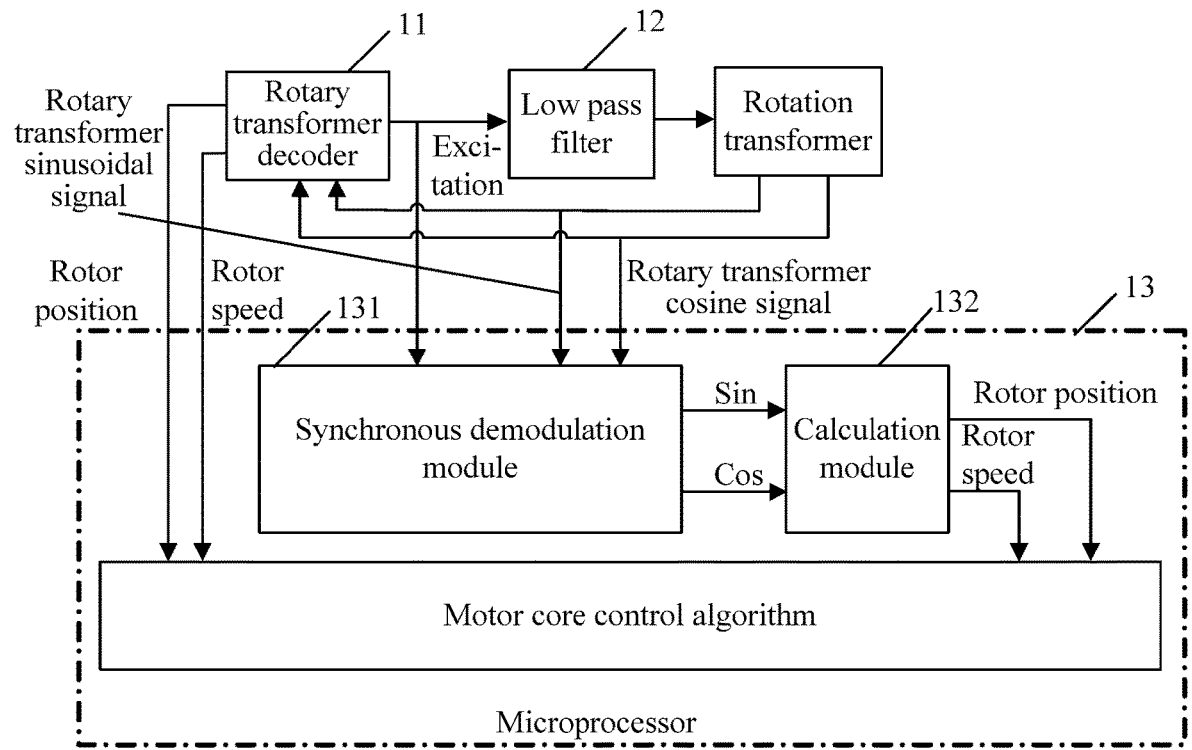
FIG. 1 is a schematic structural diagram of a system for acquiring a rotor position of a rotary transformer according to an embodiment of the present disclosure.

Therefore, a system for acquiring a rotor position of a rotary transformer is provided according to an embodiment of the present disclosure, as shown in FIG. 1. The system includes a rotary transformer decoder 11, a low pass filter 12 and a microprocessor 13. The microprocessor 13 includes a synchronous demodulation module 131 and a calculation module 132.

The rotary transformer decoder 11 is electrically connected to the rotary transformer through the low pass filter 12, and is configured to output an excitation signal to drive the rotary transformer and acquire first position information of the motor rotor of the rotary transformer. The first position information includes at least a first rotor position and a first rotor speed.

The synchronous demodulation module 131 is electrically connected to the rotary transformer decoder 11 and the rotary transformer, and is configured to collect at least a rotary transformer cosine signal and a rotary transformer sinusoidal signal outputted from the rotary transformer and output a feedback signal. The feedback signal includes at least a target rotary transformer sinusoidal signal and a target rotary transformer cosine signal.

The calculation module 132 is connected to the synchronous demodulation module 131, and is configured to perform calculation to acquire second position information of the motor rotor of the rotary transformer based on the feedback signal and according to a preset algorithm. The second position information includes at least a second rotor position and a second rotor speed.

As can be seen, according to the technical solution of the present disclosure, the rotary transformer decoder acquires the rotor position, the synchronous demodulation module acquires the rotary transformer sinusoid signal and the rotary transformer cosine signal outputted from the rotary transformer decoder, and the calculation module acquires another rotor position according to a preset algorithm. With this system, the reliability of the acquired rotor position can be improved.

On the basis of the above embodiments, the system for acquiring a rotor position of a rotary transformer provided according an embodiment of the present disclosure may further include a comparison module.

The comparison module is configured to compare the first position information with the second position information. In a case that a difference between the first position information and the second position information is less than or equal to a first preset threshold, one of the first position information and the second position information is outputted as target output information of the rotary transformer. In a case that the difference between the first position information and the second position information is greater than the first preset threshold, an alarm message is sent.

In this solution, the rotary transformer decoder and software decoding are integrated into the motor control system to acquire two rotor positions of the motor rotor, and the two rotor positions are compared. In a case that a preset determining condition is met, one of the rotor positions is used for motor control, and the other is used as redundant data for backup, thereby improving the reliability of the acquired rotor position.

Figure 2:
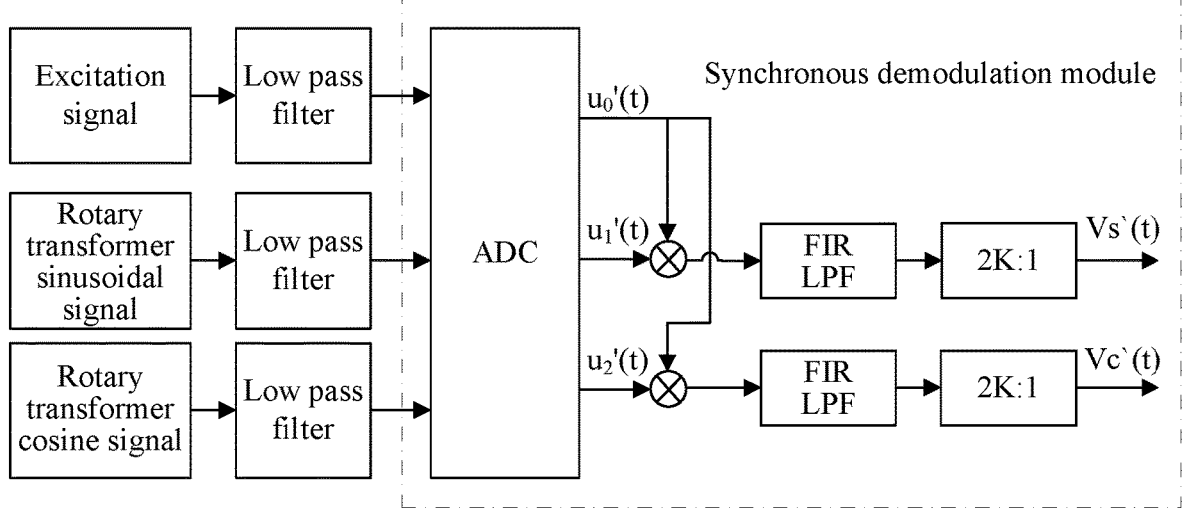
FIG. 2 is a schematic structural diagram of a synchronous demodulation module in a system for acquiring a rotor position of a rotary transformer according to an embodiment of the present disclosure.

Two structures of the synchronous demodulation module are provided according to the embodiments of the present disclosure. Referring to FIG. 2, which is a schematic structural diagram of a synchronous demodulation module in a system for acquiring a rotor position of a rotary transformer according to an embodiment of the present disclosure. The synchronous demodulation module includes: a first analog-to-digital conversion module, a first low pass filter, and a first data decimation module.

The first analog-to-digital conversion module is configured to acquire a first excitation signal with a phase delay of a first preset value obtained based on the excitation signal, the rotary transformer sinusoidal signal and the rotary transformer cosine signal with a phase delay of a second preset value, output a first digitalized excitation signal, a first digitalized rotary transformer sinusoidal signal, and a first digitalized rotary transformer cosine signal. Calculation is performed based on the first digitalized excitation signal, the first digitalized rotating sinusoidal signal, and the first digitalized rotating cosine signal, to acquire a first signal and a second signal.

The first low pass filter is configured to filter the first signal and the second signal to acquire a first filtered signal and a second filtered signal.

The first data decimation module is configured perform data decimation on the first filtered signal and the second filtered signal to acquire the target rotary transformer sinusoidal signal and the target rotary transformer cosine signal, respectively.

It should be noted that, an absolute value of the difference between the first preset value and the second preset value is less than or equal to 45 degrees.

The calculation performed based on the first digitalized excitation signal, the first digitalized rotating sinusoidal signal, and the first digitalized rotating cosine signal, to acquire the first signal and the second signal includes: obtaining a product of the first digitalized excitation signal and the first digitalized rotary transformer sinusoidal signal as the first signal, and obtaining a product of the first digitalized excitation signal and the first digitalized rotary transformer cosine signal as the second signal.

A first embodiment is described in combination with FIG. 2. The rotary transformer decoder sends an excitation signal $u_0(t)$, which is a sinusoidal signal, to the rotary transformer. The excitation signal $u_0(t)$ is filtered by a low pass filter. A phase delay with a first preset value $\gamma$ is introduced into the excitation signal $u_0(t)$ by a conditioning circuit of the synchronous demodulation module for collecting the excitation signal, to obtain a first excitation signal. The first excitation signal is inputted into the first analog-to-digital conversion module ADC to obtain a first digitalized excitation signal $u_0'(t)$. The first rotary transformer sinusoidal signal and the first rotary transformer cosine signal are filtered by low pass filters and are inputted into the synchronous demodulation module. Another phase delay with a second preset value $\delta$ is introduced by the conditioning circuit and the rotary transformer to the first rotary transformer sinusoidal signal and the first rotary transformer cosine signal, which is also inputted into the first analog-to-digital conversion module ADC to obtain a first digitalized rotary transformer sinusoidal signal $u_1'(t)$, and a first digitalized rotary transformer cosine signal $u_2'(t)$. Given that the turns ratio of the rotary transformer is 1, and $\theta$ is the rotor position, the excitation signal $u_0(t)$, the first digitalized excitation signal $u_0'(t)$, the first digitalized rotary transformer sinusoidal signal $u_1'(t)$, and the first digitalized rotary transformer cosine signal $u_2'(t)$ are respectively expressed by the following equations:

$$u_0(t)=U_0 \cdot \sin(\omega_{ref} t),$$

$$u_0'(t)=U_0 \cdot \sin(\omega_{ref} t - \gamma),$$

$$u_1'(t)=U_0 \cdot \sin(\omega_{ref} t - \delta) \cdot \sin \theta, \text{ and}$$

$$u_2'(t)=U_0 \cdot \sin(\omega_{ref} t - \delta) \cdot \cos \theta.$$

The first signal $V_S(t)$ and the second signal $V_C(t)$ are obtained based on the first digitalized excitation signal $u_0'(t)$, the first digitalized rotary transformer sinusoidal signal $u_1'(t)$, and the first digitalized rotary transformer cosine signal $u_2'(t)$ according to the following equations:

$$V_S(t) = u_1'(t) \cdot u_0'(t) = \frac{U_0^2}{2}[\sin\theta\cos(\gamma-\delta) - \sin\theta\cos(2\omega_{ref} - \gamma - \delta)], \text{ and}$$

$$V_C(t) = u_1'(t) \cdot u_0'(t) = \frac{U_0^2}{2}[\cos\theta\cos(\gamma-\delta) - \cos\theta\cos(2\omega_{ref} - \gamma - \delta)].$$

The first signal $V_S(t)$ and the second signal $V_C(t)$ are filtered by the first low pass filter FIR LPF. Only components related to the motor rotor are retained to acquire the first filtered signal and the second filtered signal. Then, the first data decimation module (represented by 2K:1 in FIG. 3) performs data decimation on the first filtered signal and the second filtered signal to acquire the target rotary transformer sinusoidal signal $V_S'(t)$ and the target rotary transformer cosine signal $V_C'(t)$, which are respectively expressed by the following equations:

$$V_S'(t) = \frac{U_0^2}{2}\sin\theta\cos(\gamma-\delta), \text{ and}$$

$$V_C'(t) = \frac{U_0^2}{2}\cos\theta\cos(\gamma-\delta).$$

In order to ensure the accuracy of the subsequent angle calculation and the phase-locked loop, the amplitudes of the target rotary transformer sinusoidal signal $V_S'(t)$ and the target rotary transformer cosine signal $V_C'(t)$ are maintained close to $U_0^2/2$, that is, the difference between the first preset value $\gamma$ and the second preset value $\delta$, that characterizes the delayed phases, needs to be less than or equal to ±45 degrees.

Figure 3:
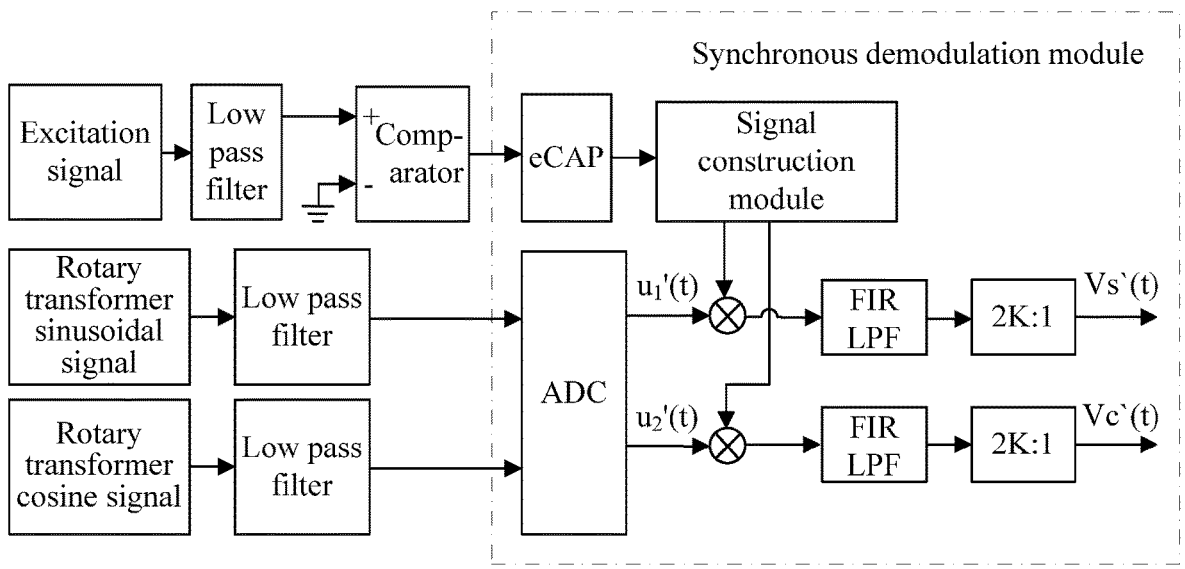
FIG. 3 is schematic structural diagram of a synchronous demodulation module in a system for acquiring a rotor position of a rotary transformer according to another embodiment of the present disclosure.

A second embodiment is described in combination with FIG. 3. An implementation of the synchronous demodulation module is provided in this embodiment. The synchronous demodulation module includes: a pulse capture module, a signal construction module, a second analog-to-digital conversion module, a second low pass filter, and a second data decimation module.

The excitation signal is converted into a second excitation signal by a preset comparator. The pulse capture module is configured to acquire a period of the second excitation signal. The signal construction module is connected to the pulse capture module, and is configured to acquire a signal parameter of the excitation signal and construct a constructed excitation signal based on the signal parameter. The signal parameter includes at least a frequency and a phase of the excitation signal.

The second analog-to-digital conversion module is configured to acquire the rotary transformer sinusoidal signal and the rotary transformer cosine signal, and output a second digitalized rotary transformer sinusoidal signal and a second digitalized rotary transformer cosine signal. Calculation is performed based on the constructed excitation signal, the second digitalized rotary transformer sinusoidal signal, and the second digitalized rotary transformer cosine signal, to acquire a third signal and a fourth signal.

The second low pass filter is configured to filter the third signal and the fourth signal to acquire a third filtered signal and a fourth filtered signal.

The second data decimation module is configured to perform data decimation on the third filtered signal and the fourth filtered signal to acquire the target rotary transformer sinusoidal signal and the target rotary transformer cosine signal.

Specifically, the calculation performed based on the constructed excitation signal, the second digitalized rotary transformer sinusoidal signal, and the second digitalized rotary transformer cosine signal, to acquire the third signal and the fourth signal includes: obtaining a product of the constructed excitation signal and the second digitalized rotary transformer sinusoidal signal as the third signal, and obtaining a product of the constructed excitation signal and the second digitalized rotary transformer cosine signal as the fourth signal.

As shown in FIG. 3, the excitation signal is filtered by a low pass filter and is converted into a square wave signal containing the excitation phase and frequency information by a preset comparator. The square wave signal is inputted into the pulse capture module (the eCAP of the synchronous demodulation module shown in FIG. 3) and the signal construction module, by which the frequency and the phase of the excitation signal is acquired, and a constructed excitation signal is constructed based on the frequency and the phase of the excitation signal. The constructed excitation signal is expressed by the following equation:

$$u_0'(t)=U_0 \cdot \sin(\omega_{ref} t - \gamma).$$

Unlike the first embodiment in which the delay phase is adjusted by adjusting the parameters of the hardware circuit, the preset value $\gamma$ of the phase delay in the second embodiment is set by software, which is convenient for modification. Similarly, the amplitudes of the target rotatory transformer sinusoidal signal $V_S'(t)$ and the target rotatory transformer cosine signal $V_C'(t)$ are maintained close to $U_0^2/2$.

After the frequency and the phase of the excitation signal are acquired, the process in subsequent stages is the same as that in the first embodiment. That is, calculation is performed based on the constructed excitation signal, the second digitalized rotary transformer sinusoidal signal, and the second digitalized rotary transformer cosine signal, to acquire a third signal and a fourth signal. Then, the third signal and the fourth signal are filtered by the second low pass filter to acquire a third filtered signal and a fourth filtered signal. The second data decimation module performs data decimation on the third filtered signal and the fourth filtered signal to acquire the target rotary transformer sinusoidal signal Vs'(t) and the target rotary transformer cosine signal Vc'(t).

In addition, after the target rotary transformer sinusoidal signal and the target rotary transformer cosine signal are acquired, phases of the target rotary transformer sinusoidal signal Vs'(t) and the target rotary transformer cosine signal Vc'(t) are locked to acquire the second rotor position and the second rotor speed of the rotary transformer, based on an observer. Alternatively, phases of the third signal and the fourth signal are locked to acquire the rotor position and the rotor speed of the rotary transformer, based on an observer.

As can be seen, in this solution, the rotary transformer decoder and software decoding are integrated into the motor control system to acquire two rotor positions of the motor rotor, and the two rotor positions are compared. In a case that a preset determining condition is met, one of the rotor positions is used for motor control, and the other is used as redundant data for backup, thereby improving the reliability of the acquired rotor position.

Figure 4:
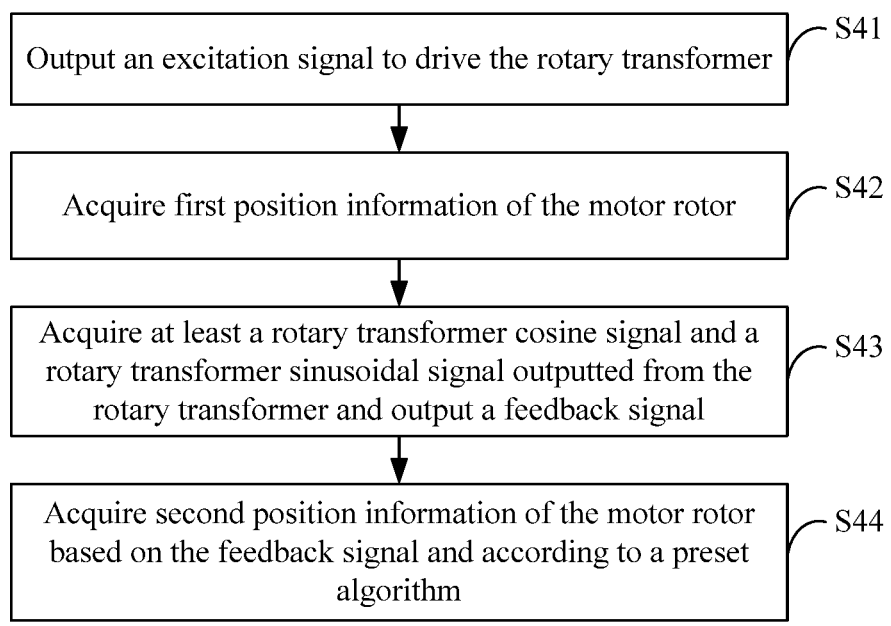
FIG. 4 is a flow chart of a method for acquiring a rotor position of a rotary transformer according to an embodiment of the present disclosure.

On basis of the above embodiment, as shown in FIG. 4, a method for acquiring a rotor position of a rotary transformer is further provided according to an embodiment of the present disclosure. The method is applicable to the system for acquiring a rotor position of a rotary transformer according to any one of the above embodiments. The method includes the following steps S41 to S44.

In step S41, an excitation signal is outputted to drive the rotary transformer.

In step S42, first position information of the motor rotor of the rotary transformer is acquired. The first position information includes at least a first rotor position and a first rotor speed.

In step S43, at least a rotary transformer cosine signal and a rotary transformer sinusoidal signal outputted from the rotary transformer are acquired, and a feedback signal is outputted. The feedback signal includes at least a target rotary transformer sinusoidal signal and a target rotary transformer cosine signal.

In step S44, calculation is performed to acquire second position information of the motor rotor of the rotary transformer, based on the feedback signal and according to a preset algorithm. The second position information includes at least a second rotor position and a second rotor speed.

Figure 5:
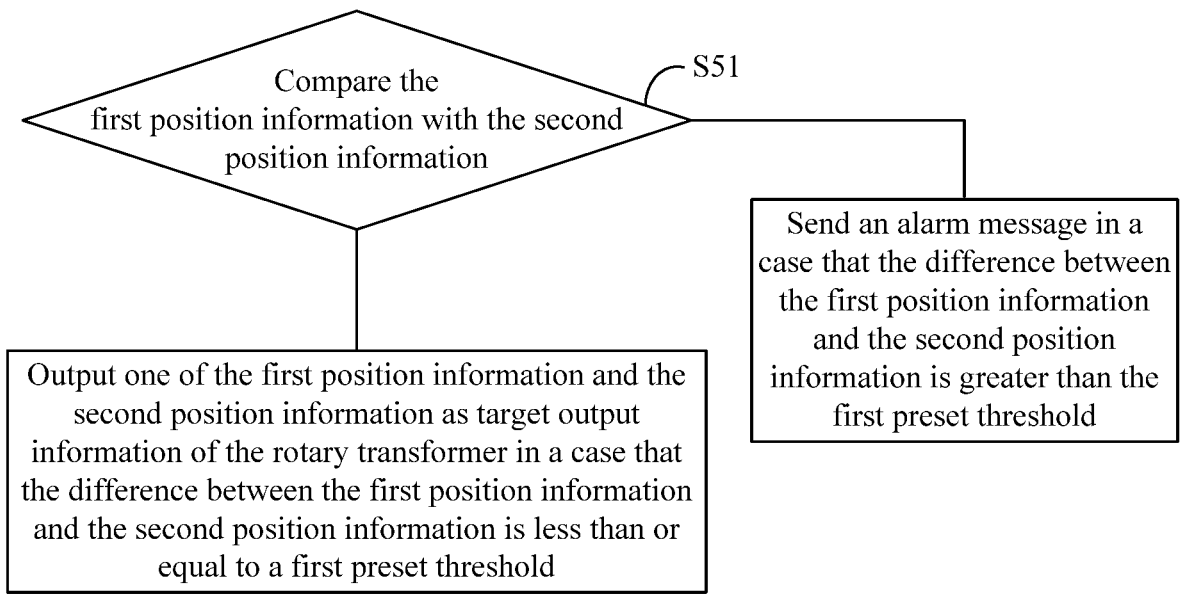
FIG. 5 is flow chart of a method for acquiring a rotor position of a rotary transformer according to another embodiment of the present disclosure.

In an embodiment, as shown in FIG. 5, the method further includes the following step S51.

In step S51, the first position information is compared with the second position information. One of the first position information and the second position information is outputted as a target output information of the rotary transformer in a case that a difference between the first position information and the second position information is less than or equal to a first preset threshold. An alarm message is sent in a case that the difference between the first position information and the second position information is greater than the first preset threshold.

The operating principle of the method embodiment can be referred to the system embodiment above.

In view of the above, a method and a system for acquiring a rotor position of a rotary transformer is provided according to the embodiments of the present disclosure. The system includes: a rotary transformer decoder, a low pass filter and a microprocessor. The microprocessor includes a synchronous demodulation module and a calculation module. The rotary transformer decoder is configured to output an excitation signal to drive the rotary transformer and acquire first position information of the motor rotor of the rotary transformer, the first position information including at least a first rotor position and a first rotor speed. The synchronous demodulation module is configured to collect at least a rotary transformer cosine signal and a rotary transformer sinusoidal signal outputted from the rotary transformer and output a feedback signal. The feedback signal includes at least a target rotary transformer sinusoidal signal and a target rotary transformer cosine signal. The calculation module is configured to perform calculation to acquire second position information of the motor rotor of the rotary transformer based on the feedback signal and according to a preset algorithm. The second position information includes at least a second rotor position and a second rotor speed. In this solution, the rotary transformer decoder and software decoding are integrated into the motor control system to acquire two rotor positions, and the two rotor positions are compared. In a case that a preset determining condition is met, one of the rotor positions is used for motor control, and the other is used as redundant data for backup, thereby improving the reliability of the acquired rotor position.

The above embodiments are described in a progressive manner. Embodiments in this specification are described in a progressive manner, each of the embodiments emphasizes differences between the embodiment and other embodiments, and the same or similar parts among the embodiments can be referred to each other. Since device embodiments are similar to method embodiments, the description thereof is relatively simple, and reference may be made to the description of the method embodiments for relevant parts.

It may be known by those skilled in the art that, units and steps in each method described in conjunction with the embodiments disclosed herein can be realized by electronic hardware, computer software or a combination thereof. In order to clearly illustrate interchangeability of the hardware and the software, steps and composition of each embodiment have been described generally in view of functions in the above specification. Whether the function is executed in a hardware way or in a software way depends on application of the technical solution and design constraint condition. Those skilled in the art can use different method for each application to realize the described function, and this is not considered to be beyond the scope of the application.

The steps of the methods or algorithms described in conjunction with the embodiments of the present disclosure can be implemented with hardware, software modules executed by a processor, or a combination thereof. The software modules may reside in a Random Access Memory (RAM), an internal memory, a Read Only Memory (ROM), an Electrically Programmable ROM, an Electrically-Erasable Programmable ROM, a register, a hard disk, a removable disk drive, CD-ROM, or other types of storage media well known in the technical field.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. A system for acquiring a rotor position of a rotary transformer, comprising: a rotary transformer decoder, a low pass filter and a microprocessor, wherein
   the microprocessor comprises a synchronous demodulation module and a calculation module,
   the rotary transformer decoder is electrically connected to the rotary transformer through the low pass filter, and is configured to output an excitation signal to drive the rotary transformer and acquire first position information of the motor rotor, the first position information comprising at least a first rotor position and a first rotor speed,
   the synchronous demodulation module is electrically connected to the rotary transformer decoder and the rotary transformer, and is configured to collect at least a rotary transformer cosine signal and a rotary transformer sinusoidal signal outputted from the rotary transformer and output a feedback signal, the feedback signal comprising at least a target rotary transformer sinusoidal signal and a target rotary transformer cosine signal,
   the calculation module is connected to the synchronous demodulation module, and is configured to perform calculation to acquire second position information of the motor rotor based on the feedback signal and according to a preset algorithm, the second position information comprising at least a second rotor position and a second rotor speed.

2. The system according to claim 1, further comprising:
   a comparison module, configured to compare the first position information with the second position information, wherein
   in a case that a difference between the first position information and the second position information is less than or equal to a first preset threshold, one of the first position information and the second position information is outputted as target output information of the rotary transformer, and
   in a case that the difference between the first position information and the second position information is greater than the first preset threshold, an alarm message is sent.

3. The system according to claim 1, wherein the synchronous demodulation module comprises: a first analog-to-digital conversion module, a first low pass filter, and a first data decimation module,
   the first analog-to-digital conversion module is configured to acquire a first excitation signal with a phase delay of a first preset value obtained based on the excitation signal, the rotary transformer sinusoidal signal and the rotary transformer cosine signal with a phase delay of a second preset value, output a first digitalized excitation signal, a first digitalized rotary transformer sinusoidal signal, and a first digitalized rotary transformer cosine signal, wherein calculation is performed based on the first digitalized excitation signal, the first digitalized rotating sinusoidal signal, and the first digitalized rotating cosine signal, to acquire a first signal and a second signal,
   the first low pass filter is configured to filter the first signal and the second signal to acquire a first filtered signal and a second filtered signal, and
   the first data decimation module is configured perform data decimation on the first filtered signal and the second filtered signal to acquire the target rotary transformer sinusoidal signal and the target rotary transformer cosine signal, respectively.

4. The system according to claim 3, wherein,
   an absolute value of a difference between the first preset value and the second preset value is less than or equal to 45 degrees.

5. The system according to claim 3, wherein the calculation performed based on the first digitalized excitation signal, the first digitalized rotating sinusoidal signal, and the first digitalized rotating cosine signal, to acquire the first signal and the second signal comprises:
   obtaining a product of the first digitalized excitation signal and the first digitalized rotary transformer sinusoidal signal as the first signal, and
   obtaining a product of the first digitalized excitation signal and the first digitalized rotary transformer cosine signal as the second signal.

6. The system according to claim 5, wherein the calculation module being configured to perform calculation to acquire the second position information of the motor rotor based on the feedback signal and according to the preset algorithm comprises:
   the calculation module being configured to
      lock phases of the target rotary transformer sinusoidal signal and the target rotary transformer cosine signal and acquire the second rotor position and the second rotor speed of the rotary transformer, based on an observer.

7. The system according to claim 1, wherein the synchronous demodulation module comprises: a pulse capture module, a signal construction module, a second analog-to-digital conversion module, a second low pass filter, and a second data decimation module, the excitation signal is converted into a second excitation signal by a preset comparator, the pulse capture module is configured to acquire a period of the second excitation signal, the signal construction module is connected to the pulse capture module, and is configured to acquire a signal parameter of the excitation signal and construct a constructed excitation signal based on the signal parameter, the signal parameter comprising at least a frequency and a phase of the excitation signal, the second analog-to-digital conversion module is configured to acquire the rotary transformer sinusoidal signal and the rotary transformer cosine signal, and output a second digitalized rotary transformer sinusoidal signal and a second digitalized rotary transformer cosine signal, wherein calculation is performed based on the constructed excitation signal, the second digitalized rotary transformer sinusoidal signal, and the second digitalized rotary transformer cosine signal, to acquire a third signal and a fourth signal, the second low pass filter is configured to filter the third signal and the fourth signal to acquire a third filtered signal and a fourth filtered signal, and the second data decimation module is configured to perform data decimation on the third filtered signal and the fourth filtered signal to acquire the target rotary transformer sinusoidal signal and the target rotary transformer cosine signal.

8. The system according to claim 7, wherein the calculation performed based on the constructed excitation signal, the second digitalized rotary transformer sinusoidal signal, and the second digitalized rotary transformer cosine signal, to acquire the third signal and the fourth signal comprises:

obtaining a product of the constructed excitation signal and the second digitalized rotary transformer sinusoidal signal as the third signal, and obtaining a product of the constructed excitation signal and the second digitalized rotary transformer cosine signal as the fourth signal.

9. The system according to claim 8, wherein the calculation module being configured to perform calculation to acquire the second position information of the motor rotor based on the feedback signal and according to the preset algorithm comprises:

the calculation module being configured to
lock phases of the target rotary transformer sinusoidal signal and the target rotary transformer cosine signal and acquire the second rotor position and the second rotor speed of the rotary transformer, based on an observer.

10. A method for acquiring a rotor position of a rotary transformer, comprising:

outputting an excitation signal to drive the rotary transformer, acquiring first position information of the motor rotor, the first position information comprising at least a first rotor position and a first rotor speed, acquiring at least a rotary transformer cosine signal and a rotary transformer sinusoidal signal outputted from the rotary transformer and outputting a feedback signal, the feedback signal comprising at least a target rotary transformer sinusoidal signal and a target rotary transformer cosine signal, and performing calculation to acquire second position information of the motor rotor, based on the feedback signal and according to a preset algorithm, the second position information comprising at least a second rotor position and a second rotor speed.

11. The method according to claim 10, further comprising:

comparing the first position information with the second position information, outputting one of the first position information and the second position information as a target output information of the rotary transformer, in a case that a difference between the first position information and the second position information is less than or equal to a first preset threshold, and sending an alarm message, in a case that the difference between the first position information and the second position information is greater than the first preset threshold.

12. The method according to claim 10, further comprising:

acquiring a first excitation signal with a phase delay of a first preset value obtained based on the excitation signal, the rotary transformer sinusoidal signal and the rotary transformer cosine signal with a phase delay of a second preset value, outputting a first digitalized excitation signal, a first digitalized rotary transformer sinusoidal signal, and a first digitalized rotary transformer cosine signal, and performing calculation based on the first digitalized excitation signal, the first digitalized rotating sinusoidal signal, and the first digitalized rotating cosine signal, to acquire a first signal and a second signal, filtering the first signal and the second signal to acquire a first filtered signal and a second filtered signal, and performing data decimation extraction on the first filtered signal and the second filtered signal to acquire the target rotary transformer sinusoidal signal and the target rotary transformer cosine signal, respectively.

13. The method according to claim 12, wherein,
an absolute value of a difference between the first preset value and the second preset value is less than or equal to 45 degrees.

14. The method according to claim 12, wherein the performing calculation based on the first digitalized excitation signal, the first digitalized rotating sinusoidal signal, and the first digitalized rotating cosine signal, to acquire the first signal and the second signal comprises:

obtaining a product of the first digitalized excitation signal and the first digitalized rotary transformer sinusoidal signal as the first signal, and obtaining a product of the first digitalized excitation signal and the first digitalized rotary transformer cosine signal as the second signal.

15. The method according to claim 14, wherein the performing calculation to acquire the second position information of the motor rotor based on the feedback signal and according to the preset algorithm comprises:

locking phases of the target rotary transformer sinusoidal signal and the target rotary transformer cosine signal and acquire the second rotor position and the second rotor speed of the rotary transformer, based on an observer.

16. The method according to claim 10, further comprising:
   converting the excitation signal into a second excitation signal,
   acquiring a period of the second excitation signal,
   acquiring a signal parameter of the excitation signal and constructing a constructed excitation signal based on the signal parameter, the signal parameter comprising at least a frequency and a phase of the excitation signal,
   acquiring the rotary transformer sinusoidal signal and the rotary transformer cosine signal, outputting a second digitalized rotary transformer sinusoidal signal and a second digitalized rotary transformer cosine signal, and performing calculation based on the constructed excitation signal, the second digitalized rotary transformer sinusoidal signal, and the second digitalized rotary transformer cosine signal, to acquire a third signal and a fourth signal,
   filtering the third signal and the fourth signal to acquire a third filtered signal and a fourth filtered signal, and
   performing data decimation on the third filtered signal and the fourth filtered signal to acquire the target rotary transformer sinusoidal signal and the target rotary transformer cosine signal.

17. The method according to claim 16, wherein the performing calculation based on the constructed excitation signal, the second digitalized rotary transformer sinusoidal signal, and the second digitalized rotary transformer cosine signal, to acquire the third signal and the fourth signal comprises:
   obtaining a product of the constructed excitation signal and the second digitalized rotary transformer sinusoidal signal as the third signal, and
   obtaining a product of the constructed excitation signal and the second digitalized rotary transformer cosine signal as the fourth signal.

18. The method according to claim 17, wherein the performing calculation to acquire the second position information of the motor rotor based on the feedback signal and according to the preset algorithm comprises:
   locking phases of the target rotary transformer sinusoidal signal and the target rotary transformer cosine signal and acquire the second rotor position and the second rotor speed of the rotary transformer, based on an observer.

* * * * *